UNITED STATES PATENT OFFICE.

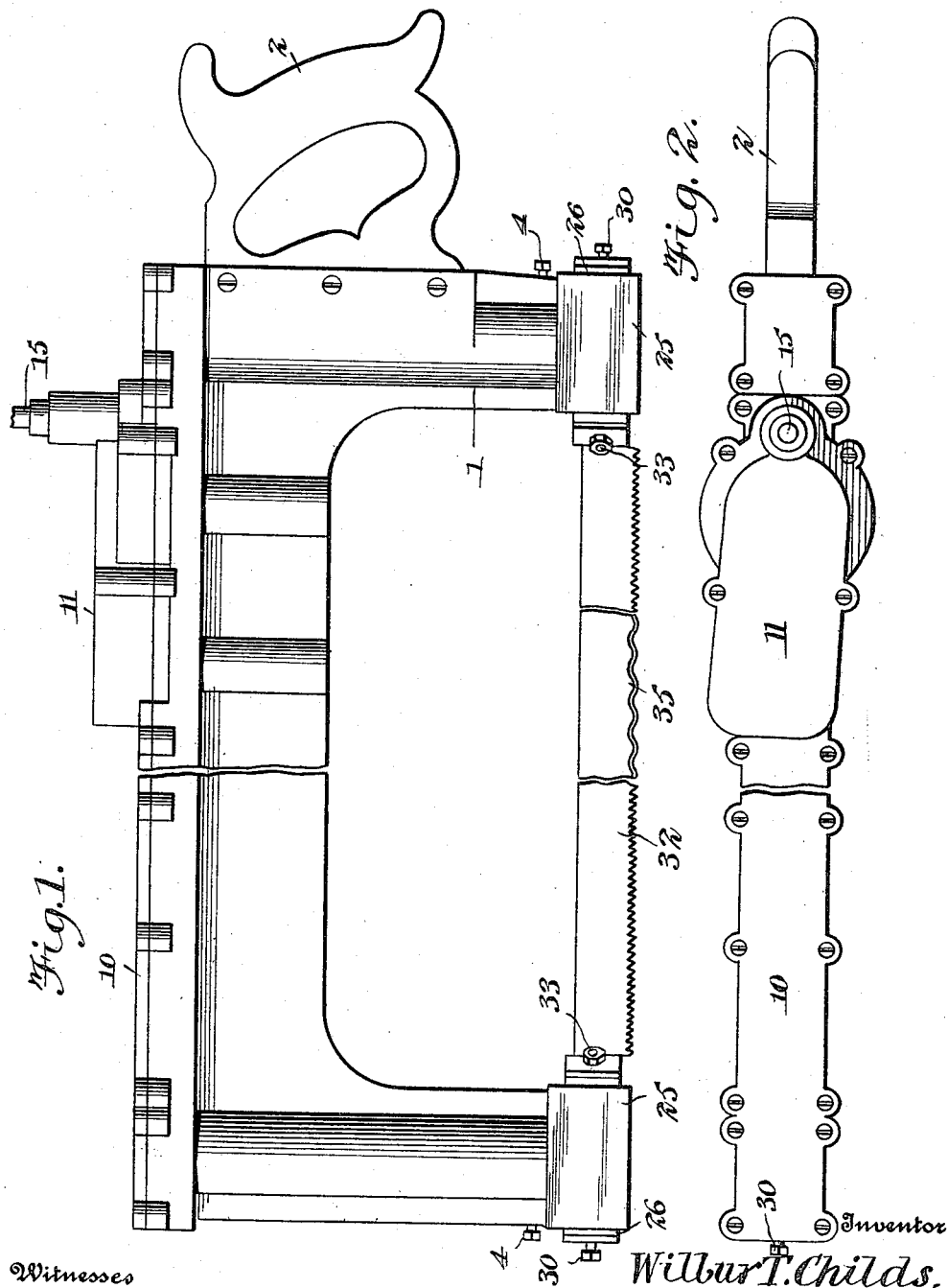

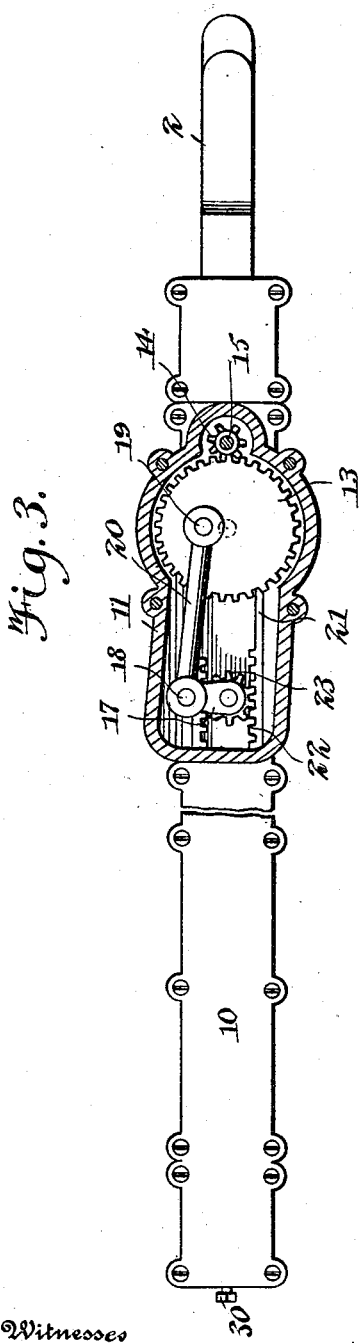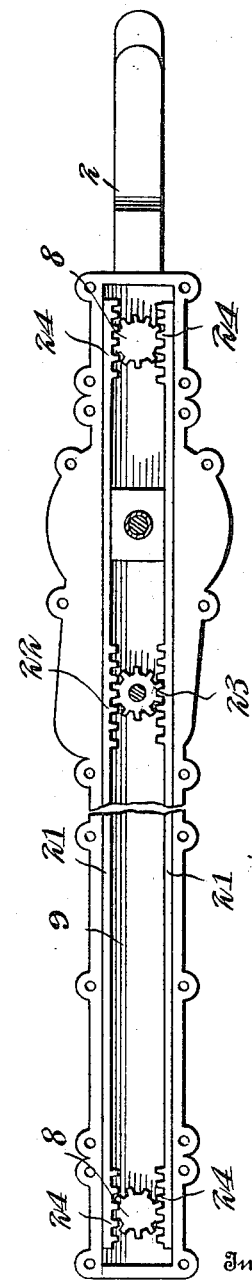

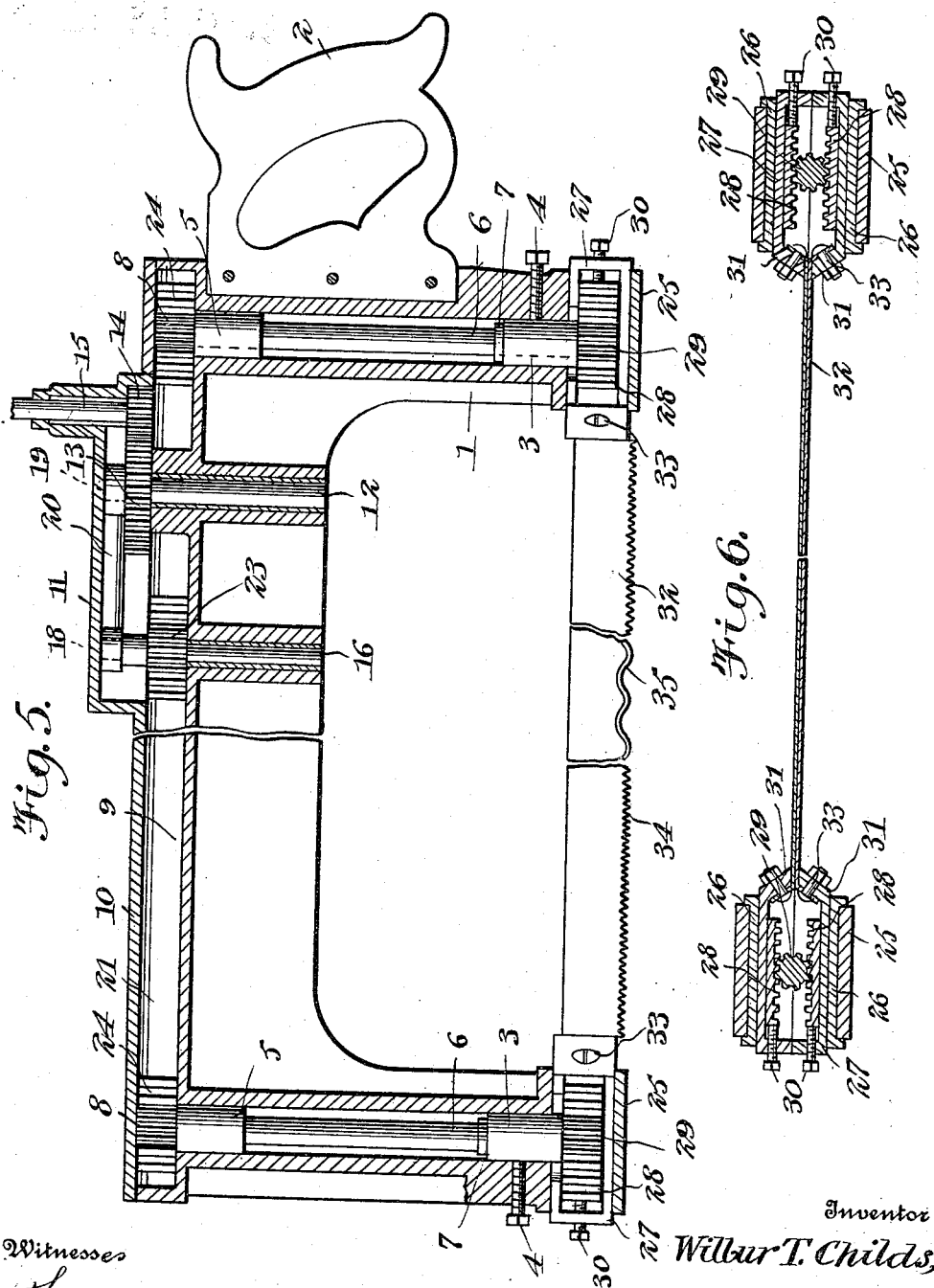

WILBUR T. CHILDS, OF AKRON, OHIO, ASSIGNOR OF ONE-HALF TO ALEXANDRE CHATELAIN, OF AKRON, OHIO.

MEAT AND BONE CUTTING MACHINE.

1,188,732.

Specification of Letters Patent.     Patented June 27, 1916.

Application filed September 24, 1915. Serial No. 52,497. REISSUED.

*To all whom it may concern:*

Be it known that I, WILBUR T. CHILDS, a citizen of the United States, residing at Akron, in the county of Summit and State of Ohio, have invented new and useful Improvements in Meat and Bone Cutting Machines, of which the following is a specification.

This invention relates to meat and bone cutting machines, especially adapted to be used by butchers or meat cutters at market stands, and it consists in the novel features hereinafter described and claimed.

An object of the invention is to provide a meat and bone cutting machine adapted to be manually held and directed and which is provided with two saws or knives mounted for movement in opposite directions, there being means provided for moving these saws or knives simultaneously in opposite directions. The saws or knives are supported in a frame which also supports the means for reciprocating these saws or knives and power may be applied to the saw or knife operating means through a flexible shaft connection or other suitable source of power.

With the above object in view the machine includes a metallic or U-shaped frame provided at one end with a handle and having shafts journaled in its opposite end portion. Means are provided in the intermediate portion of the frame for turning the shafts alternately in opposite directions, and saw or blade holders are mounted in the end portions of the frame and are adapted to be reciprocated by the said shafts. The saws or knives are held by the holders in close proximity to each other and when the machine is held in position on a piece of meat, the saws or knives cut the same in the manner in which the machine is directed. The saws sever the bones while the cutting edges of the knives sever the meat.

In the accompanying drawings:—Figure 1 is a side elevation of the meat and bone cutting machine. Fig. 2 is a top plan view of the same. Fig. 3 is a top plan view of the same with the upper portion thereof in section. Fig. 4 is a top plan view of the same with the top plate thereof removed. Fig. 5 is a vertical longitudinal sectional view of the machine. Fig. 6 is a horizontal sectional view of the machine taken through the saws thereof.
The meat and bone cutting machine comprises a frame 1 which is substantially U-shaped in side elevation and which is provided at one end with a handle 2. The end portions of the frame 1 are hollow and bearings 3 are secured therein by means of set screws 4 which pass through the sides of the said end portions and engage the said bearings whereby they are held in fixed position in the frame. Other bearings 5 are mounted in the upper portions of the ends of the frame 1 and the bearings 3 and 5 may be of bronze or any other suitable metal. The shafts 6 are journaled for rotation in the bearings 3 and 5 and traverse the length of the end portions of the frame 1. The said shafts 6 are provided at their lower portions with shoulders 7 which rest upon the upper ends of the bearings 3. Gear wheels 8 are mounted upon the upper ends of the shafts 6 and lie in a channel 9 which is provided in the upper intermediate portion of the frame 1. A plate 10 closes the upper side of the channel 9 and extends the full length of the intermediate portion of the frame 1 and is secured in position by means of screws or other suitable securing devices.

A housing 11 is mounted upon the intermediate portion of the frame 1 between the inner ends of the sections of the plate 10 and incloses the operating parts which will be explained hereinafter. A stub shaft 12 is journaled in the upper intermediate portion of the frame 1 and is provided at its upper portion with a gear wheel 13 which meshes with a gear wheel 14 carried at the lower end of a stub shaft 15 journaled in the housing 11. A flexible shaft (not shown) may be connected with the stub shaft 15 and a source of power whereby the said stub shaft is rotated. A stub shaft 16 is journaled for rotation in the upper intermediate portion of the frame 1 and is provided at its upper end with an arm 17 which is located under the housing 11. An upstanding pin 18 is provided at the end of the arm 17 and a pin 19 is eccentrically positioned upon the upper side of the gear wheel 13. The center of the pin 19 is nearer the axis of the stub shaft 12 than the center of the pin 18 with relation to the axis of the shaft 16. A connecting link 20 is loosely mounted upon the pins 18 and 19, consequently as the gear wheel 13 is rotated, one end of the link 20 is moved in a circular path around the axis of the shaft 12 while the other end of the link 20 moves back and forth partially around the axis of the shaft 16.

Bars 21 are slidably mounted in the channel 9 of the opposite sides thereof, and the said bars are disposed at the opposite sides of the shafts 12 and 16. The bars 21 are provided at intermediate points with ratchet teeth 22 which mesh with a gear wheel 23 mounted upon the stub shaft 16. Consequently as the stub shaft 16 is turned by the action of the link 20 as hereinbefore described, the bars 21 are reciprocated back and forth simultaneously in opposite directions. The bars 21 are provided at their ends with ratchet teeth 24 which mesh with the teeth of the gear wheels 8 mounted at the upper ends of the shafts 6. Hence it will be seen that as the bars 21 reciprocate as above described, the shafts 6 are turned simultaneously in opposite directions. Sleeves 25 are provided at the lower extremities of the ends of the frame 1 and the said sleeves are open from end to end and in longitudinal alinement with each other. Bearing strips 26 are located in the sleeves 25 at the opposite sides thereof, and blade holders 27 are slidably mounted in the sleeves 25 and at their outer surfaces bear against the bearing strips 26. Rack plates 28 are located in the blade holders 27 and the teeth thereof mesh with the teeth of the gear wheels 29 fixed to the lower ends of the shafts 6. Adjusting screws 30 pass through the outer ends of the blade holders 27 and engage the adjacent ends of the rack plates 28 whereby the said rack plates are held in the proper position with relation to the gear wheels 29 and the blade holders 27.

The blade holders 27 are arranged in pairs and a pair of blade holders is located in each of the sleeves 25. The ends of the members of the pair of blade holders in each sleeve 25 converge toward each other as at 31 and blades 32 are secured to the converging end 31 by means of bolts 33 which pass transversely through the converging ends of the said holders and the end portions of the blades 32 which lie against the inner surfaces of the said holders. One blade 32 is secured at its ends to the corresponding members in both of the sets of blade holders 27, hence two blades are employed and the said blades lie in close proximity to each other at their adjacent sides. The blades 32 may be provided with saw teeth 34 or cutting edges 35 or each blade may have a portion of its edge provided with a series of saw teeth and another portion with the cutting edge. When the machine is in operation the saw teeth 34 sever the bone while the cutting edges 35 incise the muscles and sinews of the meat.

It will be apparent that as the shafts 6 turn simultaneously in opposite directions the gear wheels 29 carried at the lower ends thereof and coöperating with the rack plates 28 move the blade holders 27 of the same set of blade holders alternately in opposite directions, consequently the blades 32 which are carried by the blade holders are simultaneously reciprocated in opposite directions. By reason of the fact that the blades 32 are moved by the pulling strain exerted upon them through the shafts 6 and the blade holders, the screws 30 may be adjusted whereby the rack plates 28 may be positioned to properly transmit the pulling strain from the shafts 6 to the blade holders 27. Furthermore the adjusting screws may be turned to compensate for any expansion or contraction of the blade 32 and thus cause the said blade to operate in a regular and even manner in the event that they should by reason of contraction or expansion become varied in length with relation to each other, therefore, it will be seen that in view of the fact that the blades 32 are moved in response to the pulling strain exerted thereon, it is not necessary to insert any abutment or stops between the ends of the rack plates 28 and the converging ends 31 of the blade holders 27.

From the above description taken in conjunction with the accompanying drawing, it will be seen that a combined meat and bone cutter of simple and durable structure is provided and that the same may be used to advantage for efficiently and accurately cutting meat and bone upon stands or other places where slices or cuts are removed from sides or other large portions of the carcass.

Having described the invention what is claimed is:—

1. A meat and bone cutting machine comprising a frame, blade holders movably mounted in the frame and arranged in pairs and located one pair at each end of the frame, blades secured at their opposite ends to the corresponding members of the pairs of blade holders, said blades lying in close proximity to each other and means mounted upon the frame for reciprocating the members of the pairs of blade holders at the opposite ends of the frame simultaneously in opposite directions.

2. A meat and bone cutting machine comprising a frame, blade holders movably mounted therein, blades connected with the blade holders and movable therewith, rack plates movably mounted in the blade holders, means for adjusting the rack plates in the blade holders, shafts journaled in the frame, gear wheels carried by the shafts and meshing with the teeth of the rack plates, and means mounted upon the frame for turning the shafts simultaneously in opposite directions, whereby the rack plates and blade holders are reciprocated.

3. A meat and bone cutting machine comprising a frame, blade holders movably mounted upon the frame, blades connected with the blade holders and movable therewith, shafts journaled upon the frame and operatively connected with the blade holders, rack bars movably mounted upon the frame for oscillating the shafts simultaneously, a stub shaft journaled upon the frame, a gear wheel carried by the stub shaft and engaging the bars, an arm mounted upon the stub shaft and having an upstanding pin, a second stub shaft journaled upon the frame, means for rotating the second mentioned stub shaft, an eccentrically positioned pin carried by the second mentioned stub shaft, the last mentioned pin being nearer the axis of the second mentioned stub shaft than the first mentioned pin from the axis of the first mentioned stub shaft, and a link loosely mounted on both of said pins.

In testimony whereof I affix my signature in presence of two witnesses.

WILBUR T. CHILDS.

Witnesses:
ALEXANDRE CHATELAIN,
CHARLES HERBERICH.